3,073,949
BICYCLE LAMP
John D. Smaltz, Marion, Ind., assignor to Delta Electric Company, Marion, Ind., a corporation
Filed July 29, 1959, Ser. No. 830,367
3 Claims. (Cl. 240—7.55)

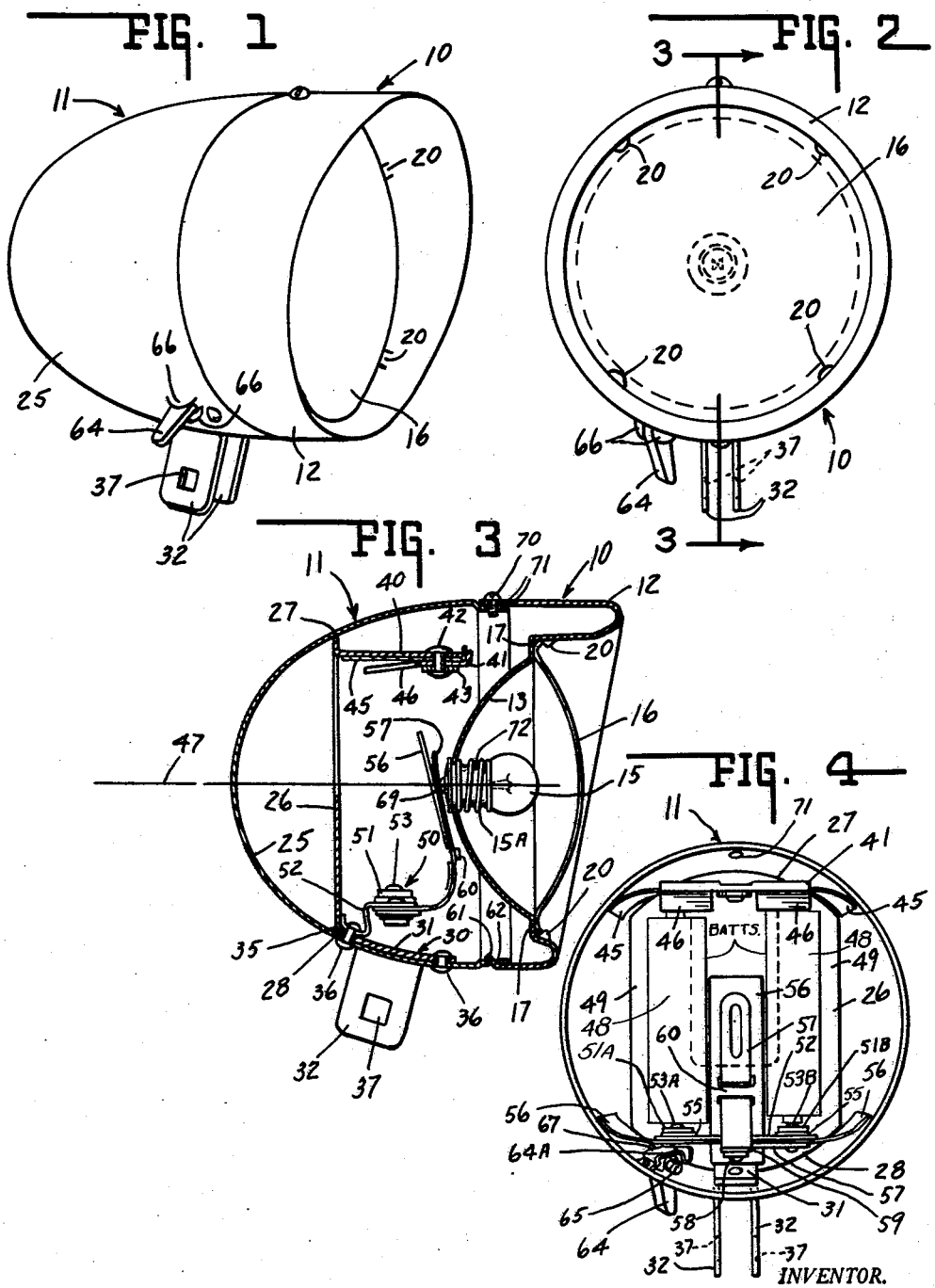

The present invention relates to lamps of the type used on bicycles as a head light.

One type of bicycle lamp having wide usage is frequently referred to as the "ball" type of lamp, no doubt because its outward configuration approaches that of a sphere. This type of lamp provides a relatively large area for the reflector of the lamp and thus provides an effective headlamp for a bicycle. This type of lamp is frequently provided with cylindrical batteries arranged in side-by-side relation with their axes perpendicular to the front-to-rear axis of the lamp and with their poles in opposite directions.

It is a primary object of the present invention to provide a "ball" type of lamp in which the usual multiplicity of parts within the lamp is reduced cutting down the cost of the lamp and the frequency of repair.

A further object of the present invention is to provide a lamp which conserves material yet is sturdy and dependable.

Further objects and advantages will become apparent as the description proceeds.

The full nature of the invention will be understood from the accompanying drawings and the following description and claims:

FIG. 1 is a perspective view of a bicycle lamp embodying the present invention.

FIG. 2 is a front elevation of the lamp illustrated in FIG. 1.

FIG. 3 is a front-to-rear sectional view taken along the line 3—3 of FIG. 2 in the direction of the arrows.

FIG. 4 is a front elevation of the lamp similar to FIG. 2 but showing the lamp with the front assembly thereof removed.

Referring now to the drawings, my invention comprises, in general, a front assembly 10 which is detachably connected to a rear assembly 11. The front assembly 10 includes a bezel piece 12, a reflector 13, an electric bulb 15 and bulb spring 15A and a lens 16. The bezel piece 12 and the reflector 13 are formed integrally and are connected by a radial annular portion 17 which provides a seat for the lens 16. A plurality of stubby projections 20—20 extend from the front bezel piece inwardly, are spaced from the radial portion 17, and act as retainers for the lens 16. Thus it can be seen that, when it is desired to replace the electric bulb 15 or lens 16, the lens 16 may be easily removed from the bezel piece 12 without disassembling the front assembly 10 from the rear assembly 11. It should also be noted that there is no necessity of providing means for attaching the reflector 13 to the bezel piece or for relative positioning of these parts because they are formed integrally.

The rear assembly 11 is made up, in part, of a cup 25 and a frame 26. As can best be seen in FIG. 4, the frame 26 has a generally rectangular shape but has rounded upper and lower edges 27 and 28, respectively, allowing the frame to fit easily within the cup toward the rear thereof. Integral with and extending forwardly from the lower edge 28 of the frame 26 is a bracket, indicated generally by the numeral 30, and made up of a main body or central portion 31 and a pair of legs 32—32. The bracket 30 and the frame 26, which are made of sheet or plate metal, are bent with relation to one another at 35 so that the central portion 31 of the bracket lies in engagement with the interior surface of the cup 25. The cup 25 has a pair of side-by-side elongated slots for reception of the legs 32 which are bent with relation to the central portion 31 of the bracket so as to extend perpendicularly of the central position through the slots in the wall of the cup. The bracket 30 is riveted or otherwise secured at 36—36 (on either side of the legs 32), thus providing a sturdy mount for the bracket and for the frame 26. Each leg 32 of the bracket may be provided with a rectangular aperture 37 for use in mounting the lamp upon the handlebars or other portion of a bicycle or the like.

A terminal mount 40 is punched out or cut from the central portion of the frame 26 in such a manner that the proximal end of the terminal mount 40 is adjacent to the upper edge 27 of the frame 26. The terminal mount 40 is bent with relation to the frame 26 so that the mount extends perpendicularly of the frame and forwardly toward the open end of the cup. An electrically conductive terminal 41 is mounted upon the forwardly extending terminal mount 40 by means of a rivet 42 but is insulated from the terminal mount 40 by an insulating washer 43 and by a generally rectangular strip of insulating material 45.

The terminal 41 has a pair of legs 46—46 which project rearwardly into the cup 25 but are inclined somewhat downwardly toward the central front-to-rear axis 47 of the cup 25. The terminal 41 is constructed of resilient material and therefore a pair of batteries 48, 48 may be placed in side-by-side relation between the terminal 41 and a lower terminal assembly indicated generally by the numeral 50. Because the legs 46 project rearwardly into the cup to a position adjacent the plane of the frame 26, the batteries may be easily inserted between the terminals, yet the batteries may also be easily removed. The fact that the center of the frame has been punched out to form the terminal mount does not interfere with the supporting function of the batteries by the frame 26 inasmuch as the two parallel portions 49 of the frame on either side of the punched out portion provide such a support.

The terminal assembly 50 is mounted upon the cup 25 and bracket 30 by means of the rivet at 36 and is made up of a pair of terminals 51A and 51B which are secured to a terminal mount 52 by means of rivets 53A and 53B but are insulated from the terminal mount by insulating washers 55—55 and by a section of insulating paper 56. A resilient generally L-shaped conductor 57 is secured to the lower surface of the terminal mount 52 by means of a rivet 58 but is insulated from the terminal mount by the section of insulating paper 56 and by insulating washer 59. The L-shaped conductor 57 is also connected electrically to the terminal 51B by means of the rivet 53B which, in addition to the rivet 58 mounts the L-shaped conductor upon terminal mount 52. The section of paper 56 has a strap 60 cut therein which is slipped over the L-shaped conductor 57 holding the paper 56 against the L-shaped conductor in order to insulate the batteries from the L-shaped conductor.

A switch member 64, which may be made of brightly colored plastic material, has a pair of oppositely projecting ears 65—65 which are received in small bearing portions 66—66 in the wall of the cup 25. The switch member 64 has formed thereon a lever arm 64A which by operation of the switch may be caused to bear against a resilient, electrically conductive member 67 riveted by one end to the inner wall of the cup 25. When the switch is operated, the lever arm 64A causes the member 67 to move upwardly and to engage the rivet 53A to provide an electrical connection between the cup and the terminal 51A.

The lamp is operated in the following manner: a pair of batteries are inserted between the terminal 41 and the terminal assembly 50. The batteries are so arranged that the poles extend in opposite directions and so that the poles of the batteries engage the legs 46 of the terminal 41 and engage the rivets 53A and B associated with terminals 51A and B. The front assembly 10 is mounted upon the rear assembly 11 by engaging a small hook 61 in a slot 62 adjacent the open end of the cup 25. As can be seen from the drawings, the cup 25 has a reduced diameter at its open end and thus the front assembly 10 may be received in nesting relationship with the cup in such manner that the front bezel piece 12 is flush and aligned with the outer surface of the cup 25. A screw 70 is threaded into apertures 71—71 in the front assembly and the cup 25 to securely mount the front assembly upon the rear assembly. The resilient L-shaped conductor 57 curves upwardly to the central axis 47 of the cup and is so shaped that, when the front and rear assemblies are secured together, conductor 57 resiliently engages the center pole or terminal 69 of the electric bulb 15 and provides electrical contact therewith. The switch 64 is operated to cause the resilient conductive member 67 to engage the leftward terminal rivet 51A causing the electric bulb 15 to be energized. The electric circuit will extend from conductive member 67 through the leftward battery to the leftward leg 46 of the terminal 41, through the terminal 41 to its rightward leg, through the rightward battery to the rightward terminal 51B, through the L-shaped conductive member 57 to the center pole of the light bulb 15, through the light bulb to its outer terminal 72, and through the reflector 13, front bezel piece 12 and cup 25 to the resilient conductive member 67.

While the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

The invention claimed is:

1. In a lamp for bicycles and the like said lamp including a cup, means for mounting the cup upon an object, means contained within the cup for providing electric power to an electric lamp, the improvement which comprises a front bezel piece, reflector and lens holder formed integrally from a single piece of sheet material, said cup including a major portion and a reduced diameter edge portion joined to the major portion by an annular shoulder, said front bezel piece including outer and inner coaxial cylindrical portions, said outer cylindrical portion being seated on said shoulder and flush with the major portion of said cup, a hook on said outer cylindrical portion engaging said cup, a screw extending through said cylindrical portion and said reduced edge portion and cooperating with said hook to detachably secure said bezel piece to said cup, said bezel piece further including an inwardly and rearwardly turned annular portion extending from the forward end of said outer cylindrical portion to the forward end of said inner cylindrical portion and joining said cylindrical portions, said lens holder including a radial annular shoulder extending inwardly from the rearward end of the inner cylindrical portion, stubby projections extending inwardly from the inner cylindrical portion for retaining a lens against said last mentioned shoulder, said reflector being concave in shape and integral with said last mentioned shoulder.

2. In a lamp for bicycles and the like said lamp including a forwardly opening cup and a frame secured within the cup for mounting batteries in a parallel relationship to a plane defined by the forward open end of the cup, the improvement which comprises a terminal for connecting a pair of batteries in series, said terminal being fixedly carried by but electrically insulated from said frame, said terminal having a pair of resilient legs projecting rearwardly of said cup and inclined toward the central axis of said cup, a terminal assembly mounted upon said frame generally parallel to and spaced from said legs whereby batteries may be forced into said cup between said terminal assembly and said legs and said legs will resiliently engage the ends of said batteries yet will allow easy removal of the batteries from said cup.

3. A lamp for bicycles and the like comprising a forwardly opening cup; a frame of sheet material secured within the cup; a terminal mount formed integrally with said frame and projecting perpendicularly thereof toward the open end of said cup, said terminal mount being a portion taken from the center of said frame in such a manner that the proximal end of said terminal mount is adjacent one edge of said frame; a front bezel piece, a reflector and lens holder formed integrally from a single piece of sheet material, said cup including a major portion and a reduced diameter edge portion joined to the major portion by an annular shoulder, said front bezel piece including outer and inner coaxial cylindrical portions, said outer cylindrical portion being seated on said shoulder and flush with the major portion of said cup, a hook on said outer cylindrical portion engaging said cup, a screw extending through said cylindrical portion and said reduced edge portion and cooperating with said hook to detachably secure said bezel piece to said cup, said bezel piece further including an inwardly and rearwardly turned annular portion extending from the forward end of said outer cylindrical portion to the forward end of said inner cylindrical portion and joining said cylindrical portions, said lens holder including a radial annular shoulder extending inwardly from the rearward end of the inner cylindrical portion, stubby projections extending inwardly from the inner cylindrical portion for retaining a lens against said last mentioned shoulder, said reflector being concave in shape and integral with said last mentioned shoulder; a terminal for connecting a pair of batteries in series, said terminal being fixed to but electrically insulated from said terminal mount, said terminal having a pair of resilient legs projecting rearwardly of said cup and inclined toward the central axis of said cup; a terminal assembly mounted upon said frame generally parallel to and spaced from said legs whereby batteries may be forced into said cup between said terminal assembly and said legs and said legs will resiliently engage the ends of said batteries yet will allow easy removal of the batteries from said cup, a bracket formed integrally with said frame for mounting the lamp, said bracket having a pair of legs projecting through the wall of said cup.

References Cited in the file of this patent

UNITED STATES PATENTS

| | | |
|---|---|---|
| 1,441,822 | Barany et al. | Jan. 9, 1923 |
| 2,041,843 | Lifschitz | May 26, 1936 |
| 2,320,446 | Peterson | June 1, 1943 |
| 2,465,114 | Oury | Mar. 22, 1949 |
| 2,564,412 | Van Haase | Aug. 14, 1951 |
| 2,710,334 | Peterson | June 7, 1955 |
| 2,745,947 | Sansous | May 15, 1956 |
| 2,817,754 | Moore | Dec. 24, 1957 |